United States Patent [19]

Namyslo

[11] Patent Number: 4,473,301

[45] Date of Patent: Sep. 25, 1984

[54] INDEXING GEAR FOR TIMEKEEPING DEVICES

[75] Inventor: Wilhelm Namyslo, Pforzheim, Fed. Rep. of Germany

[73] Assignee: Timex Corporation, Waterbury, Conn.

[21] Appl. No.: 456,197

[22] Filed: Jan. 7, 1983

[30] Foreign Application Priority Data

Feb. 26, 1982 [DE] Fed. Rep. of Germany ....... 3206946

[51] Int. Cl.$^3$ ............................................. G04B 19/24
[52] U.S. Cl. ....................................... 368/35; 368/37; 74/461
[58] Field of Search ...................... 368/35, 37; 74/437, 74/457, 460, 461

[56] References Cited

U.S. PATENT DOCUMENTS 3,496,761  2/1970  Gabriel ................................. 74/461
4,127,041  11/1978  Imazaike ............................. 74/461
4,432,081  2/1984  Schwartz et al. .................... 368/35

OTHER PUBLICATIONS

Till Patent #58162, FIGS. 1-6, 09/27/1922.

Primary Examiner—Bernard Roskoski
Attorney, Agent, or Firm—William C. Crutcher

[57] ABSTRACT

The invention relates to an indexing gear for timekeeping devices comprising a toothed wheel having an indexing tooth, a pinion indexable two teeth at a time by means of the indexing tooth of the indexing wheel, said pinion being secured against rotation between indexing operations by a shoulder of the indexing wheel, and also comprising a driven toothed wheel meshing with the pinion, the pinion having, according to the invention, slotted teeth or teeth elastically deformable in some other way, which interact with the shoulder of the indexing wheel and the teeth of the toothed wheel, such that a gear drive is obtained which is completely without any play.

4 Claims, 2 Drawing Figures

INDEXING GEAR FOR TIMEKEEPING DEVICES

BACKGROUND OF THE INVENTION

The invention relates to an indexing gear for timekeeping devices, in particular date and day rings in wrist watches. Indexing gears of this type are known, for example, in date indexing devices for analog watches and are constructed such that the weekday and/or calendar date indication can be changed quickly during the night hours. One example is disclosed in U.S. Pat. No. 3,413,800. Another example of the prior art is shown in assignee's U.S. Pat. No. 4,432,081 corresponding to laid open German application DE-OS No. 3046 569 A1, which provides for manual change of the calendar date with respect to the weekday.

In the case of known indexing gears the shoulder of the indexing wheel and the teeth of the pinion are, in view of the distance between the axes of rotation of these two elements, dimensioned such that a certain play is provided between the shoulder of the indexing wheel and the two teeth adjacent to it during intervals between individual indexing operations. This is to prevent rotation of the indexing wheel, which is normally driven by an hour wheel of the watch or clock such that it completes one full revolution within a period of 24 hours, the indexing wheel being obstructed or blocked by engagement of the pinion tooth. In a corresponding way the teeth of the driven toothed wheel and the teeth of the pinion are, with regard to their shape, also coordinated with each other such that the tooth of the pinion engaging with the driven toothed wheel has a certain play so that indexing is easy and requires only low driving power and so that any jamming between the teeth of the pinion and the teeth of the toothed wheel is avoided.

This known solution is disadvantageous in that the indication rings, i.e., the date ring and the day ring, also have a certain clearance between them with regard to their positions of indication due to the clearance between the pinion and the indexing wheel on the one hand and the pinion and the driven toothed wheel on the other. This means that inaccurate or unstable positioning of the indication means may occur, which is annoying for the user. In order to prevent this the driven toothed wheel with the date or day ring is, in the case of the known indexing gears, locked in position between indexing operations by means of a detent, which engages with a corresponding notch in the toothed wheel. This gear construction is relatively complicated due to the additional detent means required. In addition, the detent means have to be released before any adjustment of the day and/or date indication, which does become necessary from time to time, can be carried out. This results in the setting means being more expensive and more complicated in its construction.

It has already been suggested that the pinion be disposed on a displaceable shaft so that the elements of the indexing gear will interact without any play and a stable date or day indication will be obtained. It has been ascertained, however, that it is difficult with this solution to keep the power necessary for indexing and driving the indexing wheel as low as possible, which is always a requirement of wrist watches in particular.

Proceeding on the basis of the prior art, the object underlying the invention is to improve an indexing gear of the type described above, so that this will work without any play even when its construction is simple and the driving power it requires is low.

The decisive advantage of the indexing gear according to the invention is that the play between indexing wheel and pinion, which was a cause for annoyance in the case of the known construction, will be completely avoided. At the same time, an easy and positive driving of the indexing wheel is still guaranteed when the spring action or bias is kept so small that the desired absence of play is just guaranteed so that the indexing wheel can still be driven with low power, even though the teeth of the pinion abut on the shoulder of the toothed wheel for the entire interval between indexing operations. Since, in this way, the clearance between indexing wheel and pinion is completely dispensed with, the necessary play between the driven toothed wheel and the pinion can be kept so small that a stable date or day indication is guaranteed.

Furthermore, it is possible in development of the invention to coordinate the shape of the teeth for both the pinion and the driven toothed wheel such that the tooth of the pinion, which engages with the toothed wheel in the intervals between indexing operations, is adapted to be held in position between the adjacent teeth of the toothed wheel in a pre-biased condition and without any play. It is thereby possible to utilize the same spring action of the teeth of the pinion, which enables the indexing wheel and the pinion to interact without any play.

It has proven advantageous to have the pinion made from an elastically deformable plastic material which is then preferably selected such that only a very slight friction results between the shoulder of the indexing wheel and the pinion. The teeth of the pinion are preferably slotted in their longitudinal direction since this will guarantee not only that the pinion and the indexing wheel interact without any play but also that the pinion and the driven toothed wheel will interact without play.

According to another advantageous embodiment of the invention additional resilient spring tongues, which project outwards, are provided on the tooth flanks of the pinion teeth. These can also provide for sufficient bias between the indexing wheel and the pinion, on the one hand, and the toothed wheel to be driven and the pinion, on the other, when frictional losses are low.

In development of the invention it is also possible to design the teeth of the pinion as spring wires connected to the pinion's hub and bent to the shape of a loop. These may consist of the same material as the hub of the pinion or of another suitable material and form elastically deformable teeth, which can be slightly flattened at their flanks in order to achieve the desired bias relative to the indexing wheel or to the adjacent teeth of the toothed wheel.

DRAWING

Further details and advantages of the invention are explained in the following on the basis of drawing and/or are the subject matter of subclaims. The drawings show:

FIG. 1 a schematic plan and view of a preferred embodiment of an indexing gear according to the invention, and FIG. 2 an enlarged plan view of the pinion of the indexing gear according to FIG. 1.

SUMMARY OF THE INVENTION

Briefly stated, the invention is practiced by providing, in a timekeeping device, a driven indexing wheel having an indexing tooth, a pinion indexable each time by two teeth by means of the indexing tooth of the indexing wheel, said pinion being secured against rotation between indexing operations by a shoulder of the indexing wheel, said shoulder extending along a circular line and projecting with a circumferential curved section between the two adjacent teeth of the pinion, and also comprising a driven toothed wheel meshing with the pinion.

The teeth of the pinion are elastically deformable and dimensioned such that the two teeth of the pinion adjacent to the indexing wheel engage on its shoulder, in the intervals between indexing operations, in a pre-biased condition and without any play.

DESCRIPTION OF THE PREFERRED EMBODIMENT

Figure 1:
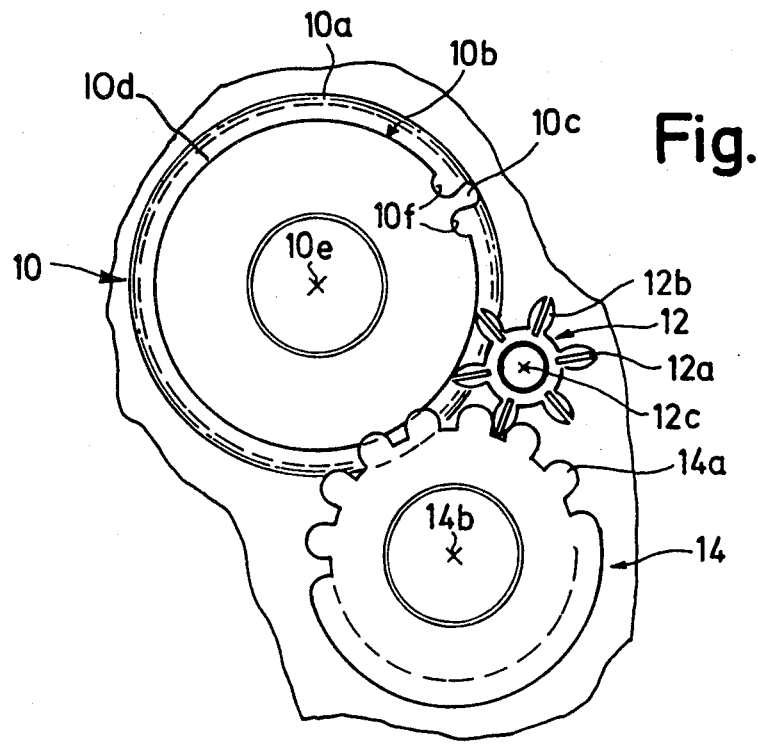

FIG. 1 shows in detail an indexing wheel 10, a pinion 12 and a driven toothed wheel 14. The indexing wheel 10 has a toothed wheel segment 10a and an indexing segment 10b with an indexing tooth 10c. The wheel also has a shoulder 10d extending along a circular line and concentrically to the axis of rotation 10e of the indexing wheel 10. The pinion 12 has a plurality of teeth 12b—six teeth in the embodiment shown—which are longitudinally slotted, i.e., slotted in the radial direction relative to an axis of rotation 12c of the pinion 12. The slots 12a in the teeth 12b of the pinion 12 result in each of the teeth 12b having two relatively flexible halves.

When the indexing wheel 10 is driven by means of the teeth on its toothed segment 10a, for example by the hour wheel of a watch movement and in a clockwise direction, then the first of the two teeth 12b of pinion 12, which are adjacent to the shoulder 10d, will slide into a recess 10f located in front of the indexing tooth 10c. This will release the pinion 12 which was otherwise blocked by the shoulder 10d such that it would not rotate. The relevant tooth 12b begins to turn when the indexing wheel 10 rotates further so that the indexing tooth 10c comes between this tooth 12b and the following tooth 12b of pinion 12. This new tooth 12b will, first of all, turn further due to a recess 10f also being provided at the back of the indexing tooth 10c until a third tooth of the pinion 12 is guided against the shoulder 10d of the indexing wheel 10 or rather the indexing segment 10b. This will prevent any further rotation of the pinion 12 and the tooth 12b located in the rear recess 10f will finally slide onto the shoulder 10d as well.

In contrast to the known indexing gears, with which there is always a certain play between the teeth of the pinion butting against the shoulder of the indexing segment and the shoulder itself, the distance between the axis of rotation 10e of the indexing wheel 10 and the axis of rotation 12c of the pinion 12 as well as the dimensions of the teeth 12b of pinion 12 are selected according to the invention such that the teeth 12b would, in a non-deformed state, protrude radially into the space enclosed by the circular line. In view of the dimensions of the interacting parts the teeth 12b of pinion 12 need to be deformable to a certain extent, this being facilitated according to the invention by the longitudinal slots 12a in the individual teeth 12b and by the choice of a suitable, elastically deformable material for the pinion 12, which will preferably be manufactured from a suitable plastic material. The halves, which are facing each other, of the teeth 12b abutting on the indexing wheel or rather the shoulder 10d will therefore be pressed outwards or away from each other, the front ends of the slots 12a being slightly tapered. In this way the teeth 12b abut on the shoulder 10d with a weak bias and force the pinion 12 into a defined position. The pinion is, consequently, no longer free to move between individual indexing operations, as described above, but is held without any play.

The teeth 14a of the driven toothed wheel 14 and the distance between the axis of rotation 14b of the toothed wheel 14 and the axis of rotation 12c of the pinion 12 are also selected such that the two halves of the tooth 12b of pinion 12 engaging between two teeth 14a of the toothed wheel 14 are pressed together to a certain extent at the front end of the tooth 12b. A drive connection without play will therefore result in this case even with a relatively low bias of the two halves of tooth 12b relative to the adjacent tooth flanks of teeth 14a. In this way, a day or date ring connected with the driven toothed wheel 14 will also be indexed without play so that an inexact or unstable positioning of the day or date indication, which is annoying to the user, can no longer occur during the individual indexing operations.

Figure 2:
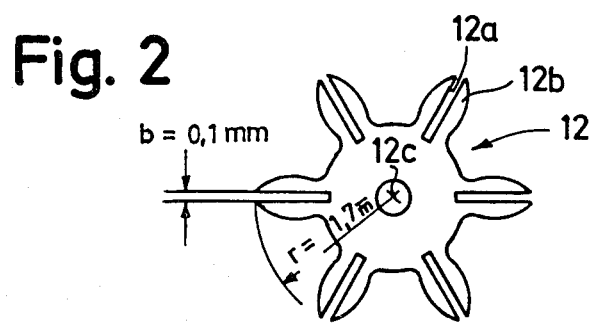

In order to convey a better idea of the features according to the invention, FIG. 2, in which only the pinion 12 is illustrated, specifies the radius "r" of the pitch circle of the tips of the teeth and the width b of the slots 12a. When the radius r is approximately 1.7 mm, a width "b" of 0.1 mm is sufficient to maintain the indexing gear without any play, as desired. These details make it clear that the biases generated relatively to the shoulder 10d and the teeth 12a are extremely low and barely increase the driving power required for the indexing gear, in particular when care is taken that only a slight friction occurs between the constructional parts engaging with each other due to a suitable choice of materials.

What is claimed is:

1. The improvement in an indexing gear for timekeeping devices, in particular date and day rings in wrist watches, said indexing gear including a driven indexing wheel having an indexing tooth, a pinion indexable by means of the indexing tooth of the indexing wheel, said indexing wheel having a circumferential shoulder on either side of the indexing tooth, said shoulder extending along a circular line and projecting with a circumferential curved section between the two adjacent teeth of the pinion, and also including a driven toothed wheel meshing with the pinion, said improvement comprising teeth of the pinion being elastically deformable and dimensioned such that the two teeth thereof adjacent to the indexing wheel engage with the shoulder so as to secure the pinion against rotation in the intervals between indexing operations, in a pre-biased condition away from each other and without any play.

2. Indexing gear improvement according to claim 1, wherein the shape of the teeth of said pinion and the shape of the teeth of said driven toothed wheel are coordinated with each other such that the tooth of the pinion, which engages on the toothed wheel in the intervals between indexing operations, is adapted to be held in position between the adjacent teeth of the toothed wheel in a pre-biased condition and without any play.

3. Indexing gear improvement according to claims 1 or 2, wherein the pinion is produced from an elastically deformable plastic material.

4. Indexing gear improvement according to any of claims 1 to 3, wherein the teeth of the pinion are slotted in their longitudinal direction, radial to the pinion axis.

* * * * *